(12) United States Patent
Shamir (10) Patent No.: US 10,600,000 B2
(45) Date of Patent: Mar. 24, 2020

(54) REGULARIZATION OF MACHINE LEARNING MODELS

(71) Applicant: Google LLC, Mountain View, CA (US)

(72) Inventor: Gil Shamir, Sewickley, PA (US)

(73) Assignee: Google LLC, Mountain View, CA (US)

(*) Notice: Subject to any disclaimer, the term of this patent is extended or adjusted under 35 U.S.C. 154(b) by 522 days.

(21) Appl. No.: 15/368,447

(22) Filed: Dec. 2, 2016

(65) Prior Publication Data

US 2017/0161640 A1   Jun. 8, 2017

Related U.S. Application Data

(60) Provisional application No. 62/263,340, filed on Dec. 4, 2015.

(51) Int. Cl.
G06N 20/00 (2019.01)

(52) U.S. Cl.
CPC .................... *G06N 20/00* (2019.01)

(58) Field of Classification Search
CPC ..................................... G06N 20/00
USPC .......................................... 706/12
See application file for complete search history.

(56) References Cited

U.S. PATENT DOCUMENTS

| | | | | |
|---|---|---|---|---|
| 6,571,225 B1 * | 5/2003 | Oles | ............ | G06K 9/6286 706/12 |
| 9,141,622 B1 * | 9/2015 | Moore | ............ | G06F 16/11 |
| 10,402,685 B2 * | 9/2019 | Guyon | ............ | G06N 20/10 |
| 2011/0078099 A1 * | 3/2011 | Weston | ............ | G06K 9/6231 706/12 |
| 2011/0119213 A1 * | 5/2011 | Elisseeff | ............ | G06K 9/6231 706/13 |
| 2013/0254153 A1 * | 9/2013 | Marcheret | ............ | G06N 20/00 706/59 |
| 2015/0019463 A1 * | 1/2015 | Simard | ............ | G06F 17/2785 706/12 |
| 2016/0358043 A1 * | 12/2016 | Mu | ............ | G06F 16/51 |
| 2017/0032244 A1 * | 2/2017 | Kurata | ............ | G10L 15/063 |
| 2019/0034830 A1 * | 1/2019 | Burangulov | ............ | G06N 20/00 |
| 2019/0057320 A1 * | 2/2019 | Docherty | ............ | G06N 20/00 |

OTHER PUBLICATIONS

International Preliminary Report on Patentability issued in International Application No. PCT/US2016/064836, dated Feb. 5, 2018, 16 pages.

(Continued)

*Primary Examiner* — Hien D Khuu (74) *Attorney, Agent, or Firm* — Fish & Richardson P.C.

(57) ABSTRACT

Methods, systems, and apparatus, including computer programs encoded on computer storage medium, for regularizing feature weights maintained by a machine learning model. The method includes actions of obtaining a set of training data that includes multiple training feature vectors, and training the machine learning model on each of the training feature vectors, comprising, for each feature vector and for each of a plurality of the features of the feature vector: determining a first loss for the feature vector with the feature, determining a second loss for the feature vector without the feature, and updating a current benefit score for the feature using the first loss and the second loss, wherein the benefit score for the feature is indicative of the usefulness of the feature in generating accurate predicted outcomes for training feature vectors.

33 Claims, 3 Drawing Sheets

(56) References Cited

OTHER PUBLICATIONS

Written Opinion of the International Preliminary Examining Authority issued in International Application No. PCT/US2016/064836, dated Nov. 8, 2017, 6 pages.
International Search Report and Written Opinion in International Application No. PCT/US2016/064836, dated Mar. 6, 2017, 12 pages.
Hinton et al. "Improving neural networks by preventing co-adaptation of feature detectors," arXiv preprint arXiv1207.0580v1, Jul. 3, 2012, 18 pages.
Shamir et al. "Minimum Description Length (MDL) Regularization for Online Learning," Journal of Machine Learning Research 44 (2015), Dec. 15, 2015, 15 pages.

* cited by examiner

REGULARIZATION OF MACHINE LEARNING MODELS

CROSS-REFERENCE TO RELATED APPLICATION

This application claims the benefit of the U.S. Provisional Application No. 62/263,340 filed Dec. 4, 2015 and entitled "Regularization of Machine Learning Models," which is hereby incorporated by reference in its entirety.

BACKGROUND

Machine learning models may be configured to analyze a predetermined set of labeled training data and then draw certain inferences from the training data. After the model is trained, the model may be fed a different set of data that is not labeled, and make generalizations about each item in the different set of data based on the inferences learned during the training phase.

In some instances, machine learning models may be trained only once based on a particular predetermined set of labeled training data. In other instances, a machine learning model may be an on-line machine learning model that may be periodically updated as new data is received.

SUMMARY

According to one innovative aspect of the present disclosure, a method for regularizing a machine learning model that is configured to receive as input a feature vector that includes a plurality of features and to generate a predicted output from the feature vector is disclosed. The method may include actions of obtaining a set of training data that includes multiple training feature vectors, and training the machine learning model on each of the training feature vectors, comprising, for each feature vector and for each of a plurality of the features of the feature vector: determining a first loss for the feature vector with the feature, determining a second loss for the feature vector without the feature, and updating a current benefit score for the feature using the first loss and the second loss, wherein the benefit score for the feature is indicative of the usefulness of the feature in generating accurate predicted outcomes for training feature vectors.

In accordance with various innovative aspects of the disclosure, overfitting may be reduced by regularizing features weights maintained by a machine learning model. The regularized feature weights may be generated by modifying an existing set of feature weights associated with features of a feature vector using a benefit score. In some implementations, the method may include selecting, for each training feature vector, a set of features that are associated with a benefit score that satisfies a predetermined threshold that can be used to train a machine learning model. Selecting, for each training vector, only those features that are associated with a benefit score that satisfies a predetermined threshold to train the machine learning model also provides the advantage of reducing the size of the machine learning model and increasing the efficiency of the machine learning model.

Other aspects include corresponding systems, apparatus, and computer programs to perform the actions of methods, encoded on computer storage devices. For a system of one or more computers to be configured to perform particular operations or actions means that the system has installed on it software, firmware, hardware, or a combination thereof that in operation cause the system to perform the operations or actions. For one or more computer programs to be configured to perform particular operations or actions means that the one or more programs include instructions that, when executed by a data processing apparatus, cause the apparatus to perform the operations or actions.

These and other aspects may optionally include one or more of the following features. For example, updating the current benefit score for the feature may include determining a difference between the first loss and the second loss and updating the current benefit score using the difference. Determining a first loss for the feature vector with the feature may be based on the feature being associated with an unregularized feature weight for the feature that is determined in an immediately preceding training iteration. Determining the second loss for the feature vector without the feature is based on the feature being scaled by a weight that reduces the impact of the feature on the outcome generated by the machine learning model.

In some implementations, the method may further include determining whether the benefit score for a feature satisfies a predetermined benefit threshold, and in response to determining that the benefit score for a feature satisfies a predetermined benefit threshold, scaling the unregularized weight associated with the feature based on the benefit score. Alternatively, or in addition, the method may further include determining whether the benefit score for a feature satisfies a predetermined benefit threshold, and in response to determining that the benefit score for a feature does not satisfy the predetermined benefit threshold, scaling the unregularized weight to a value that eliminates the feature from consideration by the machine learning model when making predictions. In each respective alternative, the benefit score may be used to determine the extent that the feature weight scaled, decreased, or the like.

In some implementations, the method may further include determining whether the benefit score for a feature satisfies a predetermined benefit threshold, and removing the feature from use in training the learning model based on a determination that the benefit score did not satisfy the predetermined benefit threshold.

In some implementations, the method may further include ranking each of the features based on the benefit score associated with each respective feature.

In some implementations, the method may further include determining a predetermined number of features to include in the learning model, and selecting the predetermined number of features based on the ranking.

In some implementations, determining a predetermined number of features to include in the learning model may be based on the amount of available storage space to store the learning model.

In some implementations, the machine learning model may be an online learning model.

The subject matter described in this specification can be implemented in particular embodiments so as to realize one or more of the following advantages. For example, the subject matter of the present specification facilitates feature selection in tandem with training of a machine learning model. Aspects of the present disclosure may include achieving increased performance by reducing model size and improving model accuracy. Specifically, the specification discloses generation of a benefit score and use of the generated benefit score to select features that have a positive impact on helping the model achieve its objective. Thus, by incorporating the benefit scores into the model training process as described in this specification, the size of the model can be reduced while maintaining a high level of accuracy and performance. These methods also increase model accuracy through the reduction of overfitting.

The details of these, and other, implementations are set forth in the accompanying drawings and the description below. Other features and advantages will be apparent from the description and drawings, and from the claims.

DETAILED DESCRIPTION

This specification describes how a system implemented as computer programs on one or more computers in one or more locations can regularize feature weights maintained by a machine learning model. A feature set associated with a machine learning model may include a plurality of n-dimensional vector of features that is trained from examples in a data set.

In one aspect of the present disclosure, a machine learning model training system is disclosed that may be configured to determine a benefit score for each feature of the machine learning model's feature set. The benefit score may be any calculated value that is indicative of whether a particular feature of an n-dimensional feature vector maintained by a machine learning model is useful in training a machine learning model to accurately predict an outcome. In one aspect of the present disclosure, the benefit score may be determined, for each particular feature by, for example, accumulating the difference between the loss without the particular feature and the loss with the fully learned weight for the particular feature. At any training example, each respective loss is computed when all features in the model other than the particular feature being updated are using their regularized weights from the previous training iteration.

Figure 1:
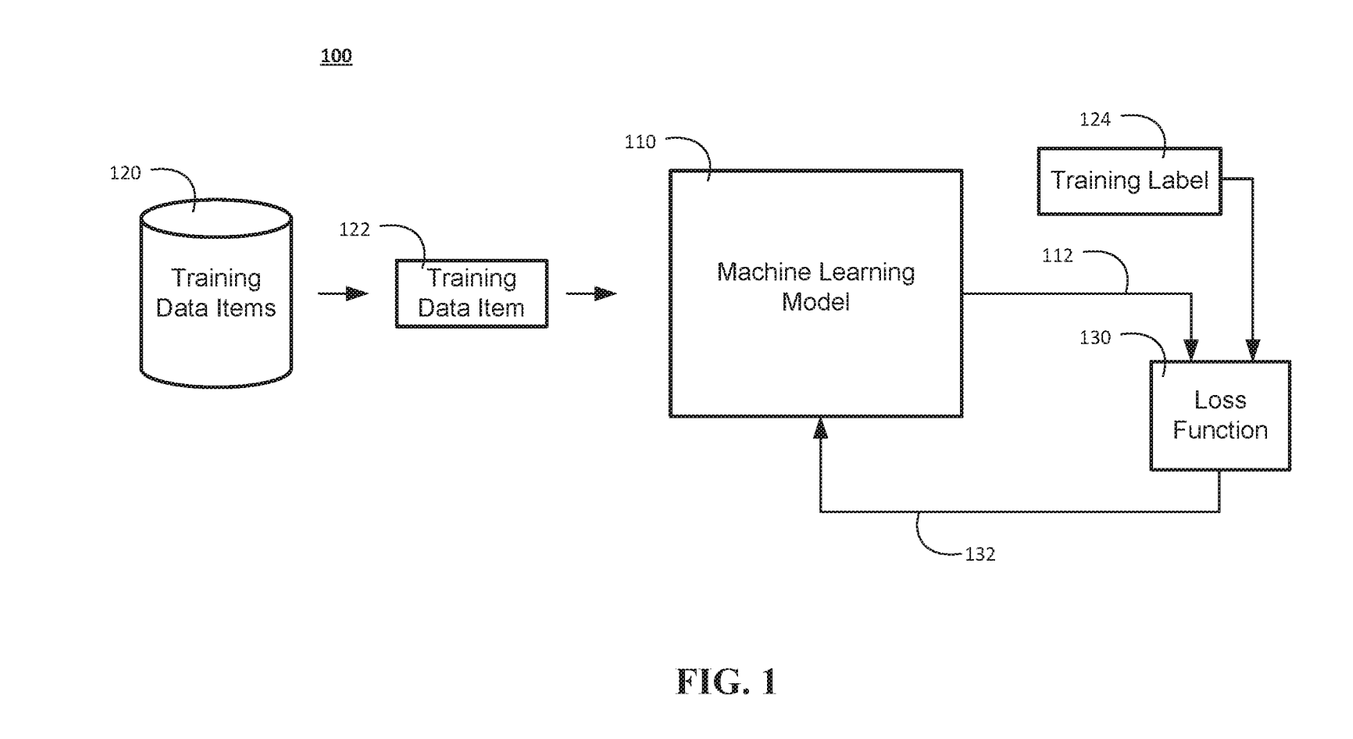
FIG. 1 is a block diagram of an example of a system for training a machine learning model.

FIG. 1 is a block diagram of an example of a machine learning model training system 100 for training a machine learning model 110. The machine learning model may be, for example, a neural network, a linear regression machine learning model, a logistic regression model, any generalized linear regression machine learning model, or the like. The machine learning model may be an on-line machine learning model, an off-line or batch machine learning model, or the like. The machine learning model training system 100 is an example of a system implemented as computer programs on one or more computers in one or more locations, in which the systems, components, and techniques described below can be implemented. The machine learning model training system 100 trains the machine learning model 110 using training data items from a database (or data set) 120 of training data items. The training data items may include a plurality of training feature vectors. Each training vector may include a plurality of values that each correspond to a particular feature of a resource. In addition, the system maintains data that specifies a respective weight for each feature that is included in the feature vectors.

The machine learning model 110 is configured to receive an input training data item 122 and to process the input training data item 122 to generate an output classification score.

The machine learning model 110 can be configured to receive feature vectors that correspond to any kind of digital data input and to generate any kind of score, prediction, or classification output based on the input. For example, if the inputs to the machine learning model 110 is a feature vector based on features that have been extracted from images, the output generated by the machine learning model 110 for the received feature vector may be scores for each of a set of object categories, with each score representing an estimated likelihood that the image contains an image of an object belonging to the category.

As another example, if the inputs to the machine learning model 110 is a feature vector based on features extracted from Internet resources, documents, or portions of documents, the output generated by the machine learning model 110 for the received feature vector may be a score for each of a set of topics, with each score representing an estimated likelihood that the Internet resource, document, or document portion is about the topic.

As another example, if the inputs to the machine learning model 110 is a feature vector based on features of a personalized recommendation for a user, e.g., features characterizing the context for the recommendation, e.g., features characterizing previous actions taken by the user, the output generated by the machine learning model 110 for the received feature vector may be a score for each of a set of content items, with each score representing an estimated likelihood that the user will respond favorably to being recommended the content item. In some of these examples, the machine learning model 110 is part of a reinforcement learning system that provides content recommendations to users.

As another example, if the input to the machine learning model 110 is a feature vector based on features of text in one language, the output generated by the machine learning model 110 for the received feature vector may be a score for each of a set of pieces of text in another language, with each score representing an estimated likelihood that the piece of text in the other language is a proper translation of the input text into the other language.

As another example, if the input to the machine learning model 110 is a feature vector based on features of a spoken utterance, the output generated by the machine learning model 110 for the received feature vector may be a score for each of a set of pieces of text, each score representing an estimated likelihood that the piece of text is the correct transcript for the spoken utterance.

To enable the machine learning model 110 to generate accurate outputs for received data items, the machine learning model training system 100 trains the machine learning model 110 to adjust the values of the parameters of the machine learning model 110, e.g., to determine trained values of the parameters from initial values.

In training the machine learning model 110, the machine learning model training system 100 uses training items from the database (data set) 120 of labeled training data items. The database 120 stores a set of multiple training items, with each training item in the set of multiple training items being associated with a respective label. Generally, the label for the training item identifies a correct classification (or prediction) for the training data item, i.e., the classification that should be identified as the classification of the training data item by the scores generated by the machine learning model 110. In some implementations, the label data for a given training item is a score distribution represented by a vector that includes a respective score for each label in the set of labels, with the scores reflecting the correct label or labels for the training item. With reference to FIG. 1, a training data item 122 may be associated with a training label 124.

The machine learning model training system 100 trains the machine learning model 110 to optimize an objective function. Optimizing an objective function may include, for example, minimizing a loss function 130. Generally, the loss function 130 is a function that depends on the (i) output 112 generated by the machine learning model 110 by processing a given training data item 122 and (ii) the label 124 for the training data item 122, i.e., the target output that the machine learning model 110 should have generated by processing the training data item 122.

Conventional machine learning model training system 100 can train the machine learning model 110 to minimize the (cumulative) loss function 130 by performing multiple iterations of conventional machine learning model training techniques on training data items from the database 120, e.g., stochastic gradient methods, stochastic gradient descent with backpropagation, or the like, to iteratively adjust the values of the parameters of the machine learning model 110. A fully trained machine learning model 110 may be then be deployed as a predicting model that can be used to make predictions based on input data that is not labeled.

The present disclosure improves the conventional machine learning model training system 100 by using a novel method that facilitates feature selection in tandem with training of a machine learning model. The method provides control over the size of the machine learning model and of a deployed predicting model and reduces overfitting. In order to reduce overfitting and reduce the size of the machine learning model, the present disclosure regularizes the feature weights maintained by the machine learning model 110 by adjusting the feature weights maintained by the machine learning model using a benefit score as shown with respect to FIGS. 2A, 2B, and 3. A benefit score may be calculated for each feature of each training feature vector based on a first loss generated by the loss function when the feature vector is processed by the machine learning model with the feature during training and a second loss generated by the loss function when the feature vector is processed by the machine learning model without the feature during training.

Figures 2A, 2B:
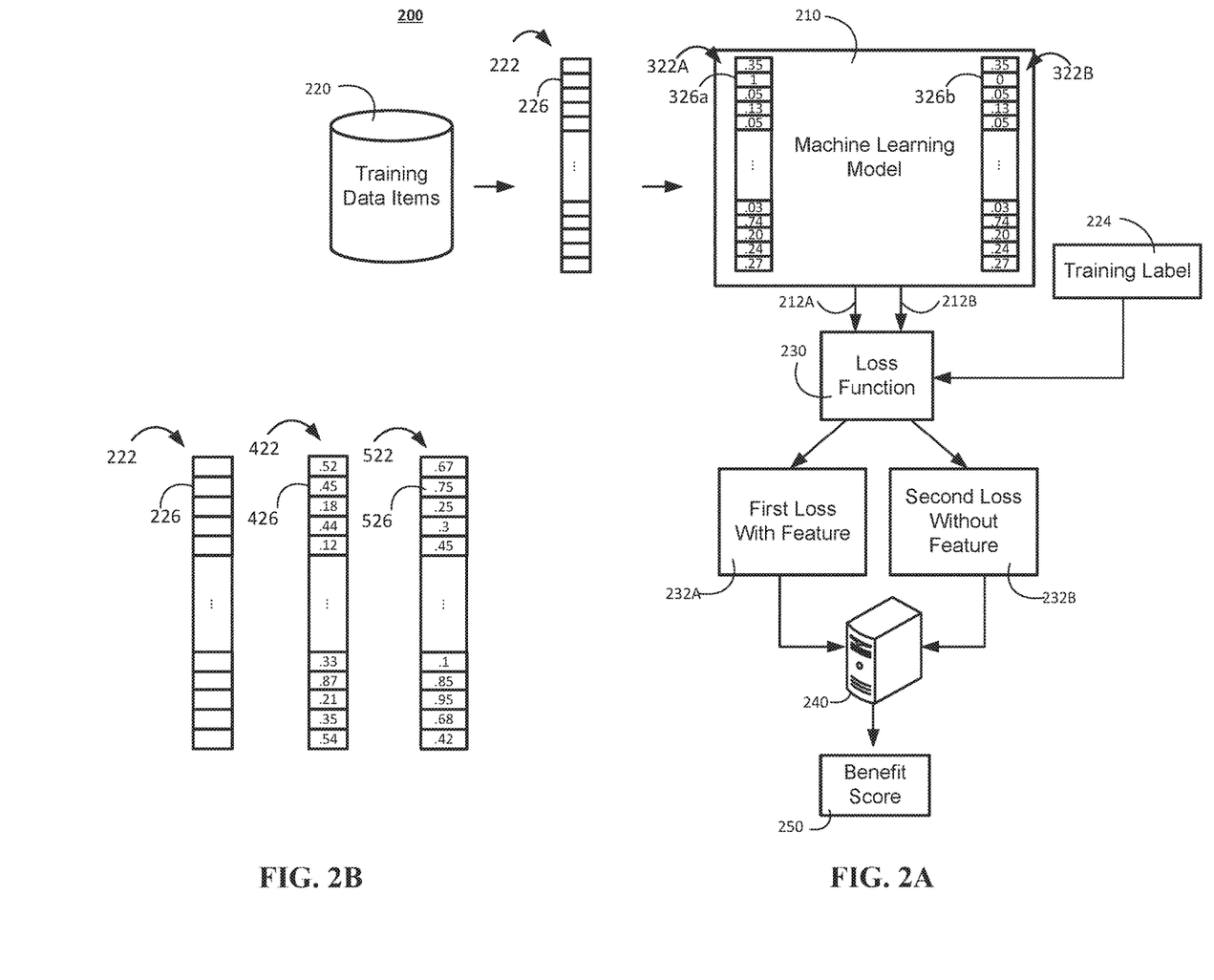
FIG. 2A is a block diagram that provides an example of a system that performs regularization based on a benefit score.
FIG. 2B an example of a cumulative benefit score vector for a feature vector.

FIG. 2A is a block diagram that provides an example of a system that performs regularization based on a benefit score. In some instances, regularization based on a benefit score facilitates complete suppression of one or more features from use by the machine learning model and or by a deployed predicting model when making inferences. The FIG. 2A depicts a machine learning model training system 200 that trains the machine learning model 210 using training data items from a database 220 of training data items. The machine learning model training system 200 may include the same features as system 100. In addition, the system 200 may include a subsystem 240 that is used to calculate a benefit score. The subsystem 240 may include one or more software algorithms used by the system 200 to calculate the benefit score, one or more computers used by the system 200 to calculate the benefit score, or a combination thereof.

The system 200 can be used to perform a process that includes training and regularization of a machine learning model. The process of training and regularization of the machine learning model begins with the system 200 obtaining a training feature vector 222 from a database 220 of training data items. The feature vector may be joined by a feature value vector. The feature value vector may be used to modify each learned weight that is maintained by the machine learning model when the machine learning model processes the feature vector.

In FIG. 2A, the system 200 provides the training feature vector 222 as an input to the machine learning model 210 during training. Then, for each feature in the training feature vector 222, the machine learning model 210 processes the training feature vector 222, in parallel, with the feature 226 at 232A and without the feature 226 at 232B. Processing the training feature vector 222 with the feature 226 is achieved by setting the regularization weight 326a maintained by the system for the feature 226 to its full unregularized weight as determined by the preceding training iteration as shown in the set of feature weights 322A. The full regularized weight may include any value computed by the machine learning model during the preceding training iteration that is representative of the feature's 326A full unregularized weight. Alternatively, some other form of the weight of feature 326A can be used, for example the regularized one. The remaining feature weights in the set of features weights 322A may be set to their current regularized value from the preceding training iteration. If the current training iteration is the first training iteration, the unregularized weight of the processed feature as well as the regularized values of the remaining feature weights will be "0."

In a similar manner, processing the training feature vector 222 without the feature 226 is achieved by setting the feature weight 326b maintained by the system for the feature 226 to a "0" as shown in the set of feature weights 322B. The remaining feature weights in the set of features weights 322B may be set to their current regularized value from the preceding training iteration. Alternatively, a reduced magnitude of the feature 326b weight can be used. If the current training iteration is the first training iteration, the current regularized value of the remaining feature weights will be "0."

Then, the machine learning model provides two outputs 212A and 212B, which represent the output of the machine learning model when processing the feature vector 222 with the feature 226 and without the feature 226, respectively. The system 200 may use the loss function 230 to calculate a first loss 232A based on the machine learning model output 212A and the training label 224 that is associated with the training feature vector 222. In a similar manner, the system 200 may use the loss function 230 to calculate, in parallel, a second loss 232B based on the machine learning model output 212B and the training label 224 that is associated with the training feature vector 222.

The first loss 232A is indicative of the amount of error that exists between the output 212A and the training label 224 when the machine learning model 210 processes the feature vector 222 with the feature 226. With the exception of the fully unregularized weight represented by "1," 326a associated with the feature 226, the first loss is calculated with the remainder of the features using with their regularized weights 322A. Similarly, the second loss 232B is indicative of the amount of error that exists between the output 212B and the training label 224 when the machine learning model 210 processes the feature vector 222 without the feature. With the exception of the feature weight 326b, which is set to "0", the second loss is calculated with the remainder of the feature weights 322B set to their current regularized value.

The computer 240 is configured to receive (i) the first loss 232A that was calculated by the loss function 230 based on the processing of the training feature vector 222 by the machine learning model 210 with the feature 226 and (ii) the second loss 232B that was calculated by the loss function 230 based on the parallel processing of the training feature vector 222 by the machine learning model 210 without feature 226. The computer 240 is configured to generate a benefit score 250 based on the first loss 232A and second loss 232B. The benefit score 250 may include a numerical value that provides a measure of usefulness of a particular feature such as feature 226 to improving the machine learning model's 210 performance. The benefit score 250 may be based on the difference between the first loss 232A and the second loss 232B.

The system 200 can be used to iteratively perform the process described with reference to FIG. 2A for each feature of each training vector in order to calculate a benefit score for each feature of each training feature vector.

FIG. 2B is an example of a cumulative benefit score vector for a feature vector. Moreover, FIG. 2B provides an example of a training feature vector 222, a set of unregularized feature weights 422 from a previous training iteration, and a cumulative benefit score vector 522.

The system 240 can calculate a benefit score for each feature of each training feature vector as described with reference to FIG. 2A. The result of such benefit score calculations is a cumulative benefit score vector 522 for each feature vector 222. The cumulative benefit score vector 522 is a vector of benefit score values that each correspond to a particular feature of a training feature vector 222. By way of example, the benefit score 526 "0.75" may correspond to the feature 226 of the feature vector 222.

The benefit score 526 can be used to adjust the unregularized feature weight 426 in the set of feature weights 422 from a previous training iteration for the feature vector 222. For example, the benefit score 526 may be compared to a predetermined threshold. If it is determined that the benefit score 526 satisfies a predetermined threshold, the benefit score 526 can be used to scale the feature weight 426. In some instances, determining that the benefit score 526 satisfies a predetermined threshold may result in the system scaling the unregularized weight using a regularization multiple of '1' for the particular feature. Alternatively, in some instances, scaling the feature weight 426 using the benefit score may include scaling down the value of the feature weight 426.

However, if it is determined that the benefit score 526 does not satisfy a predetermined threshold, the feature weight 426 may be reduced. In some instances, the feature weight 426 may be moderately reduced to reduce the feature's 226 influence on the machine learning model's 210 inferences. In yet other instances, the feature weight 426 may be completely reduced to "0" when the benefit score 526 fails to satisfy the predetermined threshold. Reducing the feature weight 426 of the feature 226 to "0" removes the feature from the machine learning model's 210 feature set used for prediction (but not from the feature set that is updated in training). The adjusted feature weight may be maintained by the machine learning model 210 as a regularized feature weight. Accordingly, each feature 226 of each training feature vector 222 may be associated with an unregularized feature weight 426, a benefit score 526, and a regularized feature weight that is determined as a function of the unregularized feature weight 426 and the benefit score 526. A deployed prediction model may omit all features whose regularized weight is reduced or reduced to "0".

Each respective unregularized feature weight may include a positive value, a negative value, or zero. The benefit score can be also positive, zero, or negative. A negative benefit score implies that using the respective feature degrades the objective. In some implementations, a regularized weight is derived from the unregularized weight and the benefit score. The regularized weight cannot reverse the sign of the unregularized weight but may be of smaller magnitude or "0". In some implementations, the regularized weight may be derived from the unregularized weight using a scaler that is a function of the benefit score. However, other methods may be used to derive the regularized weight. For instance, mathematical operations other than a multiplication may be used when creating a regularization weight based on the unregularized feature weight and the benefit score. For instance, addition of the feature weight and the benefit weight can be used. Alternatively, or in addition, a Sigmoid function of the benefit score can be used. Even other mathematical functions may be used to create a regularization weight for a particular feature based on the feature's unregularized weight and the feature's benefit score.

In the examples described with respect to FIGS. 2A and 2B, multiple vectors are discussed including an unregularized feature weight vector 422, a cumulative benefit score vector 422, and regularized feature weight vectors 322A and 322B. Though these respective vectors are shown in FIGS. 2A and 2B as including particular numerical values, the present disclosure should not be limited to the numerical values included therein, or the relationships that exists between the aforementioned numerical values. Instead, the values of unregularized feature weights, benefit scores, and regularized feature weights can be computed, or otherwise determined, using the methods disclosed by this specification.

Figure 3:
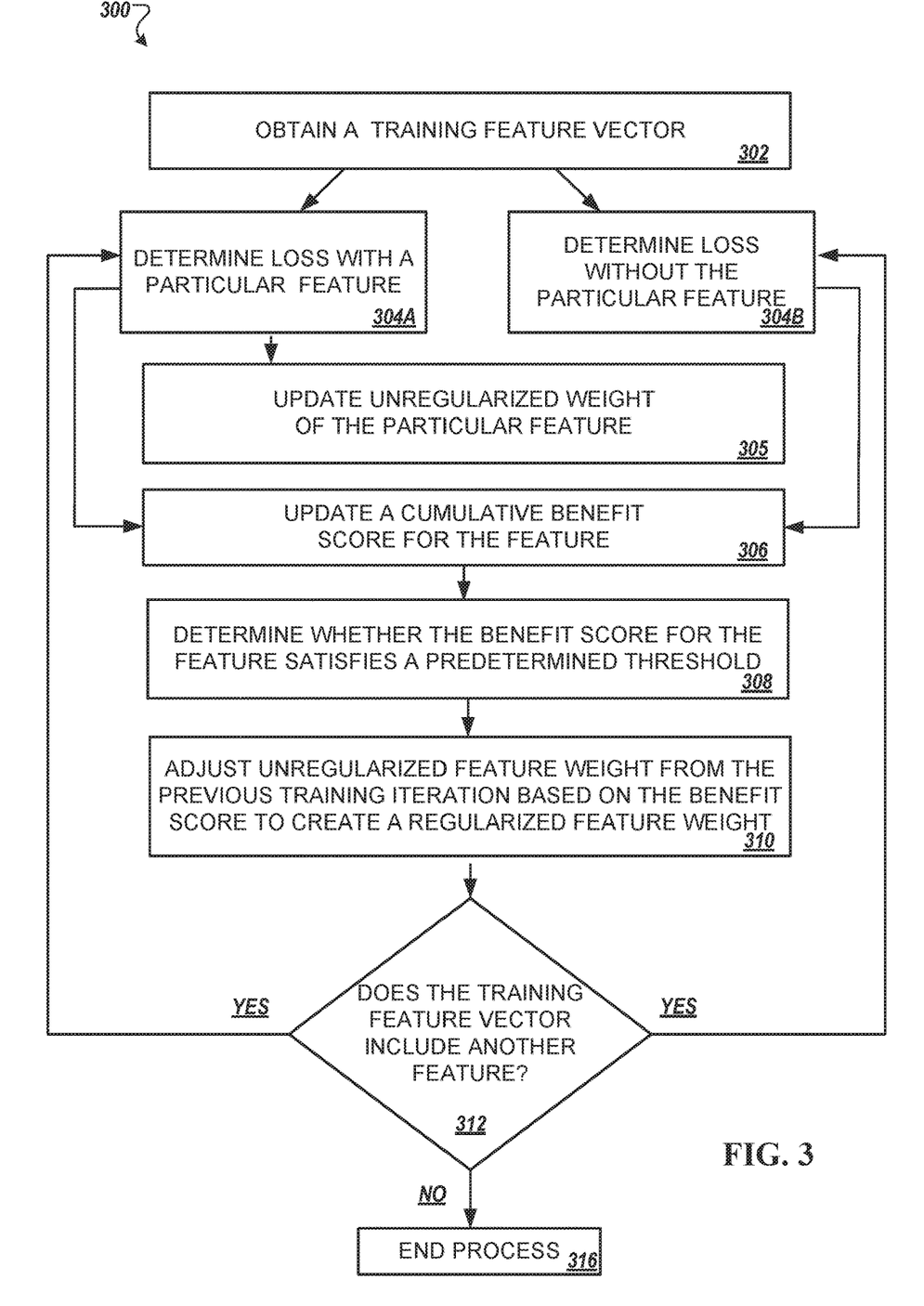
FIG. 3 is an example of a process for regularizing feature weights for each feature of a training vector.

FIG. 3 is an example of using a process for regularizing feature weights for each feature of a training feature vector. For convenience, the process 300 will be described as being performed by a system of one or more computers located in one or more locations. For example, a system such as the machine learning model training system 100, which is also used as the system 200 in FIG. 2A, can be appropriately programmed in accordance with this specification to perform the process 300.

The system can begin performing the process 300 by obtaining 302 a training feature vector from a database of training items. The training data items maintained in the database of training data items may be obtained from a third party that previously labeled the training data items. The training data items may include a plurality of training feature vectors. In some implementations, the obtained training feature vector is associated with a label that establishes the correct classification of the training feature vector. The label may have been determined by one or more human users. In some implementation, the feature vector is associated with feature values for each of the features.

Next, the system begins the training process by using a machine learning model to process, in parallel, the obtained training feature vector with a particular feature and without the particular feature. Processing, by the machine learning model, the obtained training feature vector with the particular feature includes processing the obtained training feature vector with the particular unregularized weight of the feature. Alternatively, other functions of the regularized weight, such as the regularized weight, can be used. Processing, by the machine learning model, the obtained training feature vector without the particular feature includes processing the obtained training feature vector with the particular feature weight set to "0" or some small value.

As a result of processing the training feature vector with the particular feature and without the particular feature, the system can use a loss function to determine a first loss with the particular feature 304A and also to determine a second loss without the particular feature 304B. Each respective loss is calculated using features weights from the previous training iteration. When determining the first loss with the particular feature, the system uses regularized feature weights from the prior training iteration for all features except the particular feature to calculate the loss. However, for the particular feature, the system uses the unregularized feature weight from the previous training iteration for the particular feature to determine the first loss. Then, when determining the second loss without the feature, the system uses only the regularized weights of all other features from the previous training iteration to determine the loss without the feature. For the first training iteration, the unregularized weights, the regularized weights, and the benefit scores for each feature will be "0." Alternatively, in some implementations, the unregularized weights, regularized weights, and the benefit scores for each feature may also be set to initial values other than "0." The system will use a function of the determined loss with the feature calculated at 304A to update 305 the unregularized feature weights of the model from the previous training iteration at the close of each training iteration. An example of such a function of the loss is the gradient of the loss multiplied by a learning rate function.

At stage 306, the system may use the first loss with the particular feature determined at 304A and the second loss without the particular feature determined at 304B to update a cumulative benefit score for the particular feature. Updating the cumulative benefit score for the particular feature includes, for example, determining the difference between the first loss and the second loss. Then, the cumulative benefit score from the preceding iteration may be updated based on the determined difference between the first loss and the second loss.

In some, but not all, implementations, the system may determine whether the benefit score for the particular feature satisfies a predetermined benefit-score threshold at stage 308. This may include, for example, comparing the updated cumulative benefit score for the particular feature to the predetermined benefit-score threshold. The predetermined benefit-score threshold may provide a mechanism for controlling the size and accuracy of the machine learning model and of a deployed predicting model. This is because the benefit-score threshold can control the number of features that are used in applying the machine learning model for its purpose (classification, prediction, or the like). In some implementations, the benefit-score threshold can be strategically set to ensure that only features that improve the machine learning model's outcome predictions are used when performing predictions with the model. Alternatively, or in addition, the benefit-score threshold may be selected to directly control the size of the machine learning model, as will be described in more detail with reference to stage 310. As a byproduct, the benefit score can be used in some implementations to rank the features in the model by importance to improving the model performance.

Controlling the size of the machine learning model provides significant advantages when deploying a fully or partially trained and regularized machine learning model as a predicting model. For example, aspects of the present disclosure allow for customization of a particular machine learning model in a particular way (e.g., less features) for deployment as a predicting model in a first type of device that may have limited storage capabilities (e.g., a smartwatch, a smartphone, a tablet, a pair of smart glasses, or the like). Alternatively, for example, the present disclosure also allows for customizing the same machine learning model in a different way (e.g., more features) when deployed as a predicting model in a second type of device that may have greater storage capabilities (e.g., laptop computers, desktop computers, server computers, or the like). Alternatively, or in addition, smaller more accurate models can also be deployed in devices with greater storage capabilities.

The system may then adjust 310 the unregularized feature weight that is associated with the particular feature based on the updated cumulative benefit score for the particular feature to create a regularized feature weight. For example, if the system determines that the updated cumulative benefit score for a particular feature satisfies a predetermined benefit-score threshold, the system can decide that the particular feature is useful in helping the machine learning model optimize the machine learning model's objective function. In such instances, the system may assign a larger regularized weight to the particular feature encouraging the machine learning model to rely on the particular feature when predicting an outcome. Alternatively, for example, if the system determines that the updated cumulative benefit score for a particular feature does not satisfy a predetermined benefit-score threshold, the system can decide that the feature is not useful in helping the machine learning model to optimize the machine learning model's objective function. In such instances, the system may decrease the magnitude of the feature weight associated with the particular feature to create a regularized feature weight that discourages the machine learning model from relying on the particular feature when predicting an outcome. In some instances, the system may decide that the particular feature should be completely removed as a feature that can be used by the machine learning model or by a deployed predicting model. In such instances, the system may decrease the magnitude of the regularized feature weight associated with the particular feature to "0."

In some implementations, the actual updated cumulative benefit score may be used to adjust the unregularized feature weight for the particular feature to create a regularized feature weight. For example, the updated cumulative benefit score may be added using one or more prior benefit score values applied in a mathematical function such as a Sigmoid function applied on the unregularized weight to determine a regularized weight. Alternatively, the cumulative benefit score may be used to scale the unregularized weight to some regularize weight, where scaling implies multiplying the weight by a value between 0 and 1. In some implementations, there may be monotonic dependencies that result as a consequence of the increase of effect instigated by the cumulative benefit score. For example, the larger the score the larger the fraction of the unregularized weight which is included in the regularized weight. In some implementations, a benefit score below a predetermined benefit score threshold will eliminate the use of the respective feature from prediction, while features whose benefit score satisfies the threshold will have regularized weights that are determined from the unregularized weights independently of the benefit score. In one example, these weights will equal the unregularized weights. In another example, these weights will depend on the number of training examples seen after the updated benefit score started satisfying the threshold for the first time.

At stage 312, the system may determine whether the training feature vector obtained in stage 302 includes another feature. If the training feature vector includes another feature, the system may iteratively loop through the process 300 again beginning with stages 304A and 304B for each feature of the training feature vector. Alternatively, if it is determined that the training feature vector obtained at stage 302 does not include another feature, then the process 300 may terminate at stage 316. The system may iteratively perform the process 300 for each training feature vector in a set of training feature vectors until all training data items have been trained on.

At any time, the currently stored model can be used to predict the label of an unseen example with some feature vector. Prediction of the label is performed by using the regularized weights of all features in the feature vector of the example. A model that is required for such prediction can be deployed as a predicting model. A deployed predicting model may consist only of features for which the regularized weights are not "0." This specifically applies to the model when training ends. Only weights for features that have regularized weights different from 0 are required to be stored at that stage. The storage size of a deployed predicting model may be controlled in this manner.

Improvements in the accuracy of the machine learning model, reduction in the size of the machine learning model or a deployed predicting model, or both can be achieved by adjusting the feature weights maintained by the system. For instance, accuracy of the model can be improved by (1) appropriately regularizing the feature weights of features with larger benefit scores, (2) eliminating features with negative benefit scores from use in prediction, or (3) a combination thereof. Alternatively, or in addition, the size of the model can be reduced through the increase of the predetermined benefit-score threshold thus eliminating more features from the model. For example, the system can be programmed to reduce the feature weight to zero for those features that are associated with a benefit score that falls below a predetermined benefit-score threshold. Reduction of a feature's regularized weight to zero will prevent the machine learning model from considering that feature during inference and prediction, thereby reducing the dimensionality of the features needed to be stored when training is complete. A monotonic function of the benefit score may determine the amount of the feature's regularized weight based on the benefit score that is used. Alternatively, or in addition, the function can also use a parameter that can be tuned to the proportion of expected useful features in the model to help determining a scaling factor used to regularize the unregularized weight into the regularized weight.

Alternatively, one or more processing steps may be used to select only a subset of features that are to be relied upon by the machine learning model or a deployed prediction model when making inferences. For example, the system can rank each of the features in each respective training feature vector based on each respective feature's associated benefit score. Then, the system can select only those features that have a benefit score that satisfies a predetermined benefit-score threshold. Then, only the features of feature vectors that satisfy the predetermined benefit-score threshold can be used by the machine learning model.

In some implementations, a respective predetermined benefit-score thresholds may be established for each particular group of features. Different thresholds may be established for different feature groups. In such implementations, the machine learning model can be customized to only rely on the best sets of features from each particular group of features. The best features may be determined based on those features of each respective group that are associated with a benefit score that satisfies the predetermined benefit-score threshold of the respective group.

In some implementations, the computation and storage of an actual benefit score may not be required. Instead, the system can generate a mathematical approximation of the benefit score which can be made as a function of the loss optimized and the learned feature weights combined with the count of data instances in which the feature is active, and the label counts, and or from any other quantities stored by the learning algorithm.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A method for training a machine learning model that is configured to receive as input a feature vector that includes a plurality of features and to generate a predicted output from the feature vector, the method comprising:
  obtaining a set of training data that includes multiple training feature vectors; and
  training the machine learning model on each of the training feature vectors, comprising, for each training feature vector:
    for each feature of a plurality of the features of the training feature vector:
      determining a first loss for the training feature vector with the feature;
      determining a second loss for the training feature vector without the feature;
      updating a current benefit score for the feature using the first loss and the second loss, wherein the current benefit score for the feature is indicative of a usefulness of the feature in generating accurate predicted outcomes for training feature vectors; and regularizing the machine learning model based on the current benefit score for the feature.

2. The method of claim 1, wherein updating the current benefit score for the feature comprises determining a difference between the first loss and the second loss and updating the current benefit score using the difference.

3. The method of claim 1, wherein determining the first loss for the training feature vector with the feature is based on the feature being associated with an unregularized feature weight for the feature that is determined in an immediately preceding training iteration.

4. The method of claim 1, wherein determining the second loss for the training feature vector without the feature is based on the feature being associated with a weight that reduces an impact of the feature on the outcome generated by the machine learning model.

5. The method of claim 1, wherein regularizing the machine learning model based on the current benefit score for the feature, comprises:
   determining whether the current benefit score for the feature satisfies a predetermined benefit threshold; and
   in response to determining that the current benefit score for the feature satisfies the predetermined benefit threshold, scaling an unregularized weight associated with the feature based on the current benefit score.

6. The method of claim 1, wherein regularizing the machine learning model based on the current benefit score for the feature, comprises:
   determining whether the current benefit score for the feature satisfies a predetermined benefit threshold; and
   in response to determining that the current benefit score for the feature does not satisfy the predetermined benefit threshold, scaling an unregularized weight associated with the feature to a value that eliminates the feature from consideration by the machine learning model when making predictions.

7. The method of claim 1, wherein regularizing the machine learning model based on the current benefit score for the feature, comprises:
   determining whether the current benefit score for the feature satisfies a predetermined benefit threshold; and
   removing the feature from the machine learning model based on a determination that the current benefit score did not satisfy the predetermined benefit threshold.

8. The method of claim 1, the method further comprising:
   ranking each of the features based on the current benefit score associated with each respective feature.

9. The method of claim 8, the method further comprising:
   determining a predetermined number of features to include in the machine learning model; and
   selecting the predetermined number of features based on the ranking.

10. The method of claim 9, wherein determining the predetermined number of features to include in the learning model is based on an amount of available storage space to store the machine learning model.

11. The method of claim 1, wherein the machine learning model is an online learning model.

12. A system for training a machine learning model that is configured to receive as input a feature vector that includes a plurality of features and to generate a predicted output from the feature vector, the system comprising:
   one or more computers and one or more storage devices storing instructions that are operable, when executed by the one or more computers, to cause the one or more computers to perform operations comprising:
      obtaining a set of training data that includes multiple training feature vectors; and
      training the machine learning model on each of the training feature vectors, comprising, for each training feature vector:
         for each feature of a plurality of the features of the training feature vector:
            determining a first loss for the training feature vector with the feature;
            determining a second loss for the training feature vector without the feature;
         updating a current benefit score for the feature using the first loss and the second loss, wherein the current benefit score for the feature is indicative of a usefulness of the feature in generating accurate predicted outcomes for training feature vectors; and
         regularizing the machine learning model based on the current benefit score for the feature.

13. The system of claim 12, wherein updating the current benefit score for the feature comprises determining a difference between the first loss and the second loss and updating the current benefit score using the difference.

14. The system of claim 12, wherein determining the first loss for the training feature vector with the feature is based on the feature being associated with an unregularized feature weight for the feature that is determined in an immediately preceding training iteration.

15. The system of claim 12, wherein determining the second loss for the training feature vector without the feature is based on the feature being scaled by a weight that reduces an impact of the feature on the outcome generated by the machine learning model.

16. The system of claim 12, wherein regularizing the machine learning model based on the current benefit score for the feature, comprises:
   determining whether the current benefit score for the feature satisfies a predetermined benefit threshold; and
   in response to determining that the current benefit score for the feature satisfies the predetermined benefit threshold, scaling an unregularized weight associated with the feature based on the current benefit score.

17. The system of claim 12, wherein regularizing the machine learning model based on the current benefit score for the feature, comprises:
   determining whether the current benefit score for the feature satisfies a predetermined benefit threshold; and
   in response to determining that the current benefit score for the feature does not satisfy the predetermined benefit threshold, scaling an unregularized weight associated with the feature to a value that eliminates the feature from consideration by the machine learning model when making predictions.

18. The system of claim 12, wherein regularizing the machine learning model based on the current benefit score for the feature, comprises:
   determining whether the current benefit score for the feature satisfies a predetermined benefit threshold; and
   removing the feature from the machine learning model based on a determination that the current benefit score did not satisfy the predetermined benefit threshold.

19. The system of claim 12, the operations further comprising:
   ranking each of the features based on the current benefit score associated with each respective feature.

20. The system of claim 19, the operations further comprising:

determining a predetermined number of features to include in the machine learning model; and selecting the predetermined number of features based on the ranking.

21. The system of claim 20, wherein determining a predetermined number of features to include in the machine learning model is based on an amount of available storage space to store the learning model.

22. The system of claim 12, wherein the machine learning model is an online learning model.

23. A non-transitory computer-readable medium storing software comprising instructions executable by one or more computers which, upon such execution, cause the one or more computers to perform operations for training a machine learning model that is configured to receive as input a feature vector comprising a plurality of features and to generate a predicted output from the feature vector, the operations comprising:

obtaining a set of training data that includes multiple training feature vectors; and training the machine learning model on each of the training feature vectors, comprising, for each training feature vector:

for each feature of a plurality of the features of the training feature vector:

determining a first loss for the training feature vector with the feature;

determining a second loss for the training feature vector without the feature;

updating a current benefit score for the feature using the first loss and the second loss, wherein the current benefit score for the feature is indicative of the usefulness of the feature in generating accurate predicted outcomes for training feature vectors; and regularizing the machine learning model based on the current benefit score for the feature.

24. The computer-readable medium of claim 23, wherein updating the current benefit score for the feature comprises determining a difference between the first loss and the second loss and updating the current benefit score using the difference.

25. The computer-readable medium of claim 23, wherein determining the first loss for the training feature vector with the feature is based on the feature being associated with an unregularized feature weight for the feature that is determined in an immediately preceding training iteration.

26. The computer-readable medium of claim 23, wherein determining the second loss for the training feature vector without the feature is based on the feature being scaled by a weight that reduces an impact of the feature on the outcome generated by the machine learning model.

27. The computer-readable medium of claim 23, regularizing the machine learning model based on the current benefit score for the feature, comprises:

determining whether the current benefit score for the feature satisfies a predetermined benefit threshold; and in response to determining that the current benefit score for the feature satisfies the predetermined benefit threshold, scaling an unregularized weight associated with the feature based on the current benefit score.

28. The computer-readable medium of claim 23, wherein regularizing the machine learning model based on the current benefit score for the feature, comprises:

determining whether the current benefit score for the feature satisfies a predetermined benefit threshold; and in response to determining that the current benefit score for the feature does not satisfy the predetermined benefit threshold, scaling an unregularized weight associated with the feature to a value that eliminates the feature from consideration by the machine learning model when making predictions.

29. The computer-readable medium of claim 23, regularizing the machine learning model based on the current benefit score for the feature, comprises:

determining whether the current benefit score for the feature satisfies a predetermined benefit threshold; and removing the feature from the machine learning model based on a determination that the current benefit score did not satisfy the predetermined benefit threshold.

30. The computer-readable medium of claim 23, the operations further comprising:

ranking each of the features based on the current benefit score associated with each respective feature.

31. The computer-readable medium of claim 30, the operations further comprising:

determining a predetermined number of features to include in the machine learning model; and selecting the predetermined number of features based on the ranking.

32. The computer-readable medium of claim 31, wherein determining a predetermined number of features to include in the machine learning model is based on an amount of available storage space to store the machine learning model.

33. The computer-readable medium of claim 23, wherein the machine learning model is an online learning model.

* * * * *

UNITED STATES PATENT AND TRADEMARK OFFICE
CERTIFICATE OF CORRECTION

PATENT NO. : 10,600,000 B2  
APPLICATION NO. : 15/368447  
DATED : March 24, 2020  
INVENTOR(S) : Gil Shamir Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*